United States Patent [19]

Boecker et al.

[11] Patent Number: 4,525,461

[45] Date of Patent: Jun. 25, 1985

[54] SINTERED SILICON CARBIDE/GRAPHITE/CARBON COMPOSITE CERAMIC BODY HAVING ULTRAFINE GRAIN MICROSTRUCTURE

[75] Inventors: Wolfgang D. G. Boecker, Lewiston; Laurence N. Hailey, Niagara Falls, both of N.Y.

[73] Assignee: Kennecott Corporation, Cleveland, Ohio

[21] Appl. No.: 561,361

[22] Filed: Dec. 14, 1983

[51] Int. Cl.³ .............................................. C04B 35/56
[52] U.S. Cl. ......................................... 501/90; 264/65
[58] Field of Search ............................. 501/90; 264/65

[56] References Cited

U.S. PATENT DOCUMENTS

| | | | |
|---|---|---|---|
| 2,907,972 | 9/1959 | Schildhauer et al. | 501/90 |
| 2,938,807 | 5/1960 | Andersen | 501/90 |
| 3,275,722 | 9/1966 | Popper | 501/90 |
| 3,459,566 | 8/1969 | Wilson, Jr. | 501/90 |
| 4,124,667 | 11/1978 | Coppola et al. | 501/90 |
| 4,179,299 | 12/1979 | Coppola et al. | 501/90 |
| 4,312,954 | 1/1982 | Coppola et al. | 501/90 |
| 4,346,049 | 8/1982 | Coppola et al. | 264/65 |

*Primary Examiner*—Howard S. Williams
*Assistant Examiner*—Terryence Chapman

*Attorney, Agent, or Firm*—David M. Ronyak

[57] ABSTRACT

Sintered silicon carbide/graphite/carbon composite ceramic body having a homogeneous fine grain microstructure with at least 50 percent of its silicon carbide grains having a size not exceeding about 8 microns and an aspect ratio less than about 3, with graphite grains having an average size not exceeding that of the silicon carbide grains microns uniformly dispersed throughout the matrix of silicon carbide and having a density of at least 75 percent of theoretical can be made by firing of a shaped green body having a density of at least about 45 percent of theoretical, the shaped green body containing graphite of fine particle size, a sintering aid selected from the group consisting of aluminum, beryllium or boron or compounds containing any one or more of these or a mixture of any of the foregoing elements or compounds, silicon carbide having a surface area of from about 5 to about 100 square meters/gram and, optionally, a temporary binder at a sintering temperature of from about 1900° C. to about 2300° C. in an inert atmosphere or vacuum. The process for making such pressureless-sintered composite bodies is relatively undemanding of exact temperature/time control during sintering. Contain embodiments of such composite sintered bodies may electrical-discharge machined.

39 Claims, 23 Drawing Figures

SINTERED SILICON CARBIDE/GRAPHITE/CARBON COMPOSITE CERAMIC BODY HAVING ULTRAFINE GRAIN MICROSTRUCTURE

BACKGROUND OF THE INVENTION

This invention relates to a sintered silicon carbide/graphite/carbon composite ceramic body, a raw batch for use in making such a body, a process for making such a body. It particularly relates to pressureless-sintered, substantially homogeneous silicon carbide/graphite/carbon composite ceramic bodies, and more particularly, to those which have a very fine grain polycrystalline microstructure, and to a process for pressureless sintering of a composite ceramic body having a fine grain microstructure which process is relatively insensitive to sintering temperature and time in regard to the effect of these on the grain size or growth of grain size. The microstructure of composites according to the invention is relatively unaffected upon subsequent exposure to the temperatures near to sintering temperature as compared to that of known pressureless sintered silicon carbide/carbon bodies.

The chemical and physical properties of silicon carbide make it an excellent material for high temperature structural applications. These desirable properties include good oxidation resistance and corrosion resistance, high heat transfer coefficient compared to metals, low expansion coefficient compared to metals, high resistance to thermal shock and high strength at an elevated temperature.

It is, therefore, believed desirable to enable the production of silicon carbide/graphite/carbon composite ceramic bodies having a density which is a high percentage of the theoretical density and suitable for engineering material uses, such as for example, high temperature applications involving relatively moving parts made to close dimensional tolerances. Silicon carbide has been identified as a preferred material for such applications (for example, refer to U.S. Pat. No. 4,312,954). Silicon carbide/graphite/carbon composite ceramic bodies according to the present invention may, in some instances, be even more advantageously employed than substantially pure silicon carbide bodies because these composite bodies in certain embodiments have a very fine grain microstructure that is easy to obtain on a repetitive basis because the raw batch and process used in the manufacture of such composite bodies is relatively undemanding of exact temperature/time control during sintering. It is believed that certain embodiments will exhibit greater resistance to thermal shock and can withstand greater temperature differentials than known sintered silicon carbides. Some embodiments provide a self-lubricating characteristic which may be advantageously employed, for example, in mechanical seals. Other factors being equal, an ultrafine polycrystalline grain structure is desirable because it increases strength and resistance to mechanical shock loading, which properties depend upon the largest flaw present in a particular sintered ceramic body of a given material. The electrical conductivity of certain embodiments of the invention enables electrical discharge machining of these bodies as well as other electrical applications. This represents a significant advance in that sintered silicon carbide bodies previously were machined using expensive diamond tools which caused damage to the surface of the body being machined resulting in lower rupture resistance. The fracture toughness of certain embodiments exceeds that of known pressureless-sintered silicon carbide having a density that is a similar degree of theoretical density.

Composite bodies of silicon carbide/graphite have heretofore been produced by reaction bonding (also known as reaction sintering) and hot pressing. Reaction sintering involves use of silicon impregnants to upgrade the density of silicon carbide through reaction with excess carbon in the substrate. Reaction sintering is useful for many applications but is undesirable where excess silicon exuding from the silicon carbide body would be detrimental (e.g. high temperatures in excess of 1400° C.). Hot pressing (the production of high density silicon carbide/graphite composite ceramic bodies by simultaneous application of heat and pressure) is impractical for complex shapes because the pressure required (typically of the order of greater than 1000 psig) deforms the body. Also difficulty may be encountered in removing the hot pressed part from its complex mold.

Typical of known methods for producing composite bodies of silicon carbide/graphite are U.S. Pat. No. 2,527,829 to Leitten et al in which a coarse silicon carbide is mixed with flaked graphite and a binder which melts in the temperature range of 2000°–2300° F. This mixture is compacted into a briquette, held together by the binder. U.S. Pat. No. 2,907,972 to Schildhauer et al describes the production of a silicon carbide/silicon refractory by reaction sintering of silicon carbide/carbon with silicon. U.S. Pat. No. 4,019,913 to Weaver et al describes siliconizing of a silicon carbide/graphite mixture at a temperature greater than 2000° C. to convert the graphite into silicon carbide and results in a single phase silicon carbide body. U.S. Pat. No. 4,154,787 to W. G. Brown describes the production of a siliconized silicon carbide/carbon body particularly useful for seal rings containing free silicon which is produced by reaction bonding of a silicon carbide/carbon mixture by infiltration of silicon. U.S. Pat. Nos. 4,312,954; 4,124,667; 4,346,049; 4,179,299; 4,135,938; 4,172,109; 4,123,286; 4,135,937; 4,144,207; 4,207,226; 4,237,085 disclose silicon carbide compositions that may contain, in some instances, up to 5 percent carbon in the final sintered silicon carbide product and, in other instances, up to 6 percent uncombined carbon in the final sintered product. A body formed according to U.S. Pat. Nos. 4,135,937 and 4,135,938 may contain up to 15 percent additional carbon (beyond that in the original particulate silicon carbide) derived from graphite or carbonized organic composition. In U.S. Pat. No. 4,135,938 it is stated that it is believed that most of the additional carbon is chemically combined with the silicon carbide and additive compound (for example, BP, BN, or $AlB_2$). Thus, none of these patents disclose a fine grained sintered silicon carbide/graphite/carbon composite ceramic body. The carbon contained in the resulting product according to any of these patents remains predominately in a form other than graphite in the final sintered body.

U.S. Pat. Nos. 4,179,299 and 4,346,049 teach the inherent advantages of and disclose a sintered alpha, noncubic crystalline silicon carbide ceramic body having a predominately equiaxed microstructure; in other words, more than 50 percent of the microstructure is such that the ratio of the maximum dimension of the grains of the crystal microstructure to the minimum dimension of the grains of the crystal microstructure is less than 3 to 1. These patents may also be referred to for their teaching as to the effect on crystal size of sintering temperature and time in substantially pure silicon carbide bodies containing about 2 percent by weight of carbon. These references show that it is difficult to achieve the desired fine grain size, equiaxed microstructure unless close control over the process is maintained, particularly as regards the sintering temperature. This same problem and goal in the manufacture of dense shaped articles of alpha silicon carbide is addressed in U.S. Pat. No. 4,230,497 to Schwetz et al, who discloses use of an aluminum sintering aid to mitigate the need to maintain an exact sintering temperature.

U.S. Pat. No. 3,165,864 to Schulze describes a hot-pressed silicon carbide/graphite composite body having an exposed surface of high modulus ceramic and an interior of low modulus formed substantially of graphite. The composition gradually changes from an outer layer of siliconized silicon carbide to a substantially pure graphite inner layer.

It is, therefore, an object of this invention to provide a sintered silicon carbide/graphite/carbon composite ceramic body having a continuous phase of sintered silicon carbide, a graphite phase and, an uncombined, nongraphitic carbon phase substantially homogeneously dispersed throughout the silicon carbide matrix. "Uncombined" as used herein means not chemically combined, for example, as with silicon to form silicon carbide.

It is a further object of this invention to provide such a body from starting materials which may include alpha phase non-cubic crystalline silicon carbide, amorphous silicon carbide or beta silicon carbide. It is well known that the alpha phase silicon carbide is more thermodynamically stable than other forms and at this time is much lower in cost. Alpha-phase non-cubic crystalline silicon carbide is also much more readily obtainable than either amorphous or beta cubic silicon carbide.

It is also an object of this invention to provide a raw batch and a process including pressureless sintering for the production of such sintered silicon carbide/graphite/carbon composite ceramic bodies.

In this abstract, specification and claims, unless otherwise indicated, all quantities, proportions and ratios are stated on a weight basis.

SUMMARY OF THE INVENTION

According to a first aspect of the present invention there is provided a pressureless-sintered silicon carbide/graphite/carbon composite ceramic body consisting essentially of:
(a) from about 1 to about 48 percent by weight of graphitic carbon and having a total uncombined carbon content of from about 1.5 to about 49 percent by weight;
(b) an effective amount of sintering aid;
(c) the balance being silicon carbide;
the composite body having a homogeneous fine grain microstructure of silicon carbide grains and graphite grains with at least 50 percent of its silicon carbide grains on an area basis having a size not exceeding about 8 microns and an aspect ratio less than about 3, the body having a density of at least 75 percent of theoretical based on the law of mixtures.

According to another aspect of the present invention, there is provided a process for producing a sintered silicon carbide/graphite/carbon composite ceramic body comprising the steps of:
a. forming a homogeneous mixture comprising the components of:
1. from about 1 to about 48 percent by weight graphite powder having an average particle size not in excess of about 8 microns and a surface area of at least about 5 square meters per gram;
2. a carbon-containing additive selected from the group consisting of amorphous carbon, and a solvent soluble, organic material which can be coked at temperatures below about 1000° C. to form amorphous carbon or mixtures thereof, in an amount between 0.5 and 5 percent by weight of the homogeneous mixture of uncombined carbon;
3. from about 0.15 to about 15 percent by weight of a sintering aid selected from the group consisting of aluminum, beryllium or boron or compounds containing any one or more of these elements or a mixture of any of the foregoing elements or compounds, said sintering aid containing from about 0.15 to about 5 percent by weight of aluminum, boron or beryllium or a mixture of any of these;
4. up to 25 percent by weight of an organic temporary binder;
5. a balance of silicon carbide powder having a surface area of from about 5 to about 100 square meters per gram;
b. shaping the dry mixture in such a way as to produce a shaped body having a density of at least about 45 percent of theoretical; and
c. firing the shaped body in the absence of any substantial externally applied pressure under such conditions of time and temperature in an atmosphere inert to silicon carbide or in a vacuum at a temperature of between about 1900° C. and 2300° C. until a sintered body having a homogeneous fine grain microstructure with at least 50 percent of its silicon carbide grains on an area basis having a size not exceeding about 8 microns and an aspect ratio less than about 3, with graphite grains distributed substantially homogeneously throughout a matrix of silicon carbide, is formed.

According to another aspect of the present invention, there is provided a sintered silicon carbide/graphite/carbon composite ceramic body consisting essentially of:
(a) from about 1 to about 48 percent by weight of graphitic carbon and having a total uncombined carbon content of from about 1.5 to about 49 percent by weight;
(b) an effective amount of sintering aid;
(c) the balance being silicon carbide;
the composite body having a homogeneous fine grain microstructure of silicon carbide grains and graphite grains with at least 50 percent of its silicon carbide grains on an area basis having a size not exceeding about 8 microns and an aspect ratio less than about 3, the body having a density of at least 75 percent of theoretical density based on the law of mixtures,
produced by pressureless sintering, at a temperature of from about 1900° C. to about 2300° C., a pre-shaped object having a density before pressureless sintering of at least about 45 percent of theoretical, the pre-shaped object comprising:

i. from about 1 to about 48 percent by weight graphite having a surface area of at least about 5 sq. meters/gram and an average particle size not exceeding about 8 microns;

ii. from about 0.67 to about 17 percent by weight of an organic solvent soluble, organic material, which can be coked to provide uncombined carbon said organic material having a carbon yield of from about 0.5 to about 5 percent by weight of the object;

iii. from about 0.15 to about 15 percent by weight of a sintering aid selected from the group consisting of boron, aluminum and beryllium or compounds containing any one or more of these elements or a mixture of any of the foregoing elements or compounds, said sintering aid containing from about 0.15 to about 5 percent by weight of boron, aluminum or beryllium or a mixture of any of these;

iv. from about 0 percent to about 25 percent by weight of temporary binder; and v. the balance being silicon carbide having a surface area of from about 5 to about 100 sq. meters/gram.

According to another aspect of the present invention, there is provided a raw batch for producing a substantially homogeneous, pressureless-sintered silicon carbide/graphite/carbon composite ceramic body, comprising;

a. from about 1.0 to 48 percent by weight graphite, having an average particle size not in excess of about 8 microns and a surface area of at least about 5 square meters/gram;

b. a carbon-containing additive selected from the group consisting of amorphous carbon, and a solvent soluble, organic material which can be coked at temperatures below about 1000° C. to form amorphous carbon, or mixtures thereof, in an amount between 0.5 and 5 percent by weight of the raw batch of uncombined carbon;

c. from about 0.15 to 15 percent by weight of a sintering aid selected from the group consisting of aluminum, beryllium or boron or compounds containing any one or more of these elements or a mixture of any of the foregoing elements or compounds, said sintering aid containing from about 0.15 to about 5 percent by weight of boron, aluminum or beryllium or a mixture of any of these;

d. from about 0 to about 25 percent by weight of a temporary binder; and e. the balance being silicon carbide having a surface area of from about 5 to about 100 sq. meters/gram.

DETAILED DESCRIPTION

Figure 1:
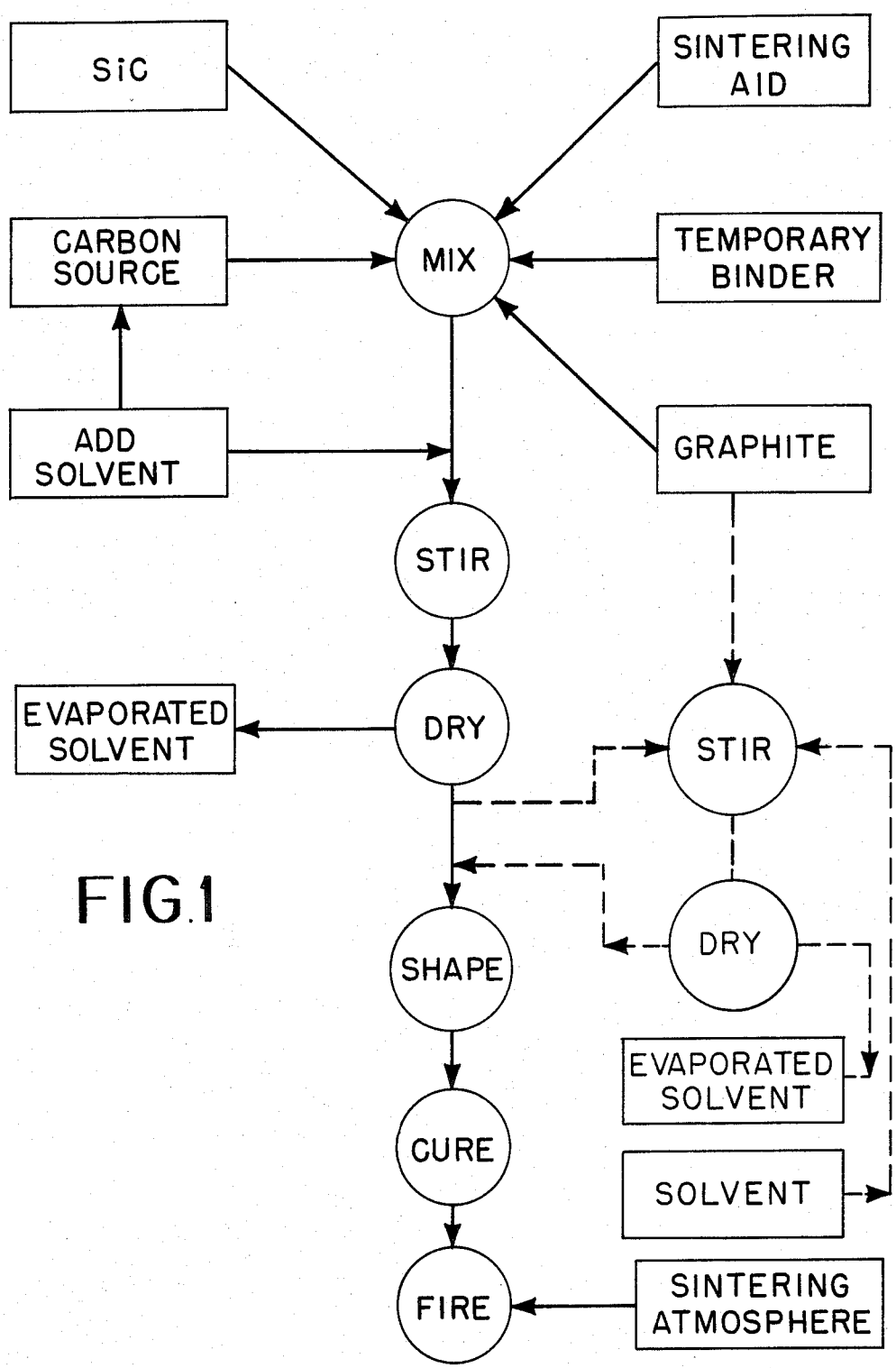
FIG. 1 of the drawing is a flow chart depicting a preferred process embodiment according to the present invention for manufacture of sintered silicon carbide/graphite/carbon composite ceramic bodies of the present invention. Dashed lines depict variations of processes according to the present invention.

The theoretical density of silicon carbide is 3.21 g/cc. The theoretical density of graphite is 2.25 g/cc. The theoretical density of carbon is 2.25 g/cc. The preferred minimum density for sintered silicon carbide/graphite/carbon composite ceramic bodies according to the present invention corresponds to about 75 percent of theoretical density. As used herein, the value of theoretical density, as it applies to a composite, is computed according to the law of mixtures which assumes that no solid solutions exist for purposes of the computation. To assure a proper understanding of the theoretical density as the term is employed herein, the following example is provided. The theoretical density of a composite comprising 3 percent graphite, 0.4 percent $B_4C$, 2 percent uncombined carbon in a form other than graphite, and 94.6 percent silicon carbide is 3.135 g/cc. The theoretical density for $B_4C$ is 2.51 g/cc; The theoretical density is the reciprocal of the sum of the volume fractions of the constituent components. Thus, for this example, it is $1/(0.03/2.25 + 0.004/2.51 + 0.2/2.25 + 0.94/3.21) = 1/(0.31665) = 3.135$ g/cc. Similarly computed, the theoretical density for a composite comprising 8 weight percent graphite, 5 weight percent Be, 2 percent uncombined C. in a form other than graphite and 85 percent silicon carbide is 2.97. More highly preferred for some applications is a density which corresponds to at least 80 percent of theoretical and for other applications a density which is at least 90 percent of theoretical. Higher density is generally desired where a low porosity and high modulus are desired.

1. Starting Components or Ingredients

A. Silicon Carbide Powder

The silicon carbide starting material can be obtained from any of a variety of sources. Vapor phase reactive material is produced in fine particle size and can be used if desired. Larger material can be ball milled until sufficient amounts of fine silicon carbide are obtained and the proper size of silicon carbide can be selected from the ball milled product by conventional means, such as water sedimentation.

The crystalline habit of the silicon carbide starting material is not believed to be critical. Alpha, non-cubic silicon carbide is more readily available than beta silicon carbide, lower in price and more thermodynamically stable and, therefore, the preferred starting material. It is acceptable, however, to use silicon carbide that has been made by a process which produces mixtures of alpha and beta silicon carbide and, thus, the next most preferred silicon carbide is that which is predominately alpha, non-cubic crystalline silicon carbide. It is also possible to utilize high purity beta silicon carbide powder but such material is not preferred because of its high expense in the requisite high purity form.

Preferably, the silicon carbide material is relatively free of materials such as silicon, silicon dioxide and oxygen which may interfer with the sintering operation. To ensure this, the silicon carbide material be treated prior to its use in processes according to the invention or the manufacture of articles according to the invention with acid (such as hydrofluoric and/or nitric acids, particularly mixtures of hydrofluoric and nitric acids) to remove extraneous materials such as silicon, silicon dioxide and oxygen which may interfere with the sintering operation.

The silicon carbide powder must be of fine particle size. Suitable silicon carbide powders have maximum particle size of 8 microns or less, and preferably submicron size particles predominate. It is difficult, however, to obtain accurate particle size distributions for silicon carbide powders having a particle size of much less than 1 micron and the surface area of the silicon carbide particle is a more relevant characteristic in determining suitable material. Accordingly, the preferred silicon carbide particles for use in the process of the present invention to produce sintered composite ceramic bodies of the present invention are specified as having from about 5 to about 100 square meters/gram surface area. Within this range, it is more preferred that the surface area of the silicon carbide particles range between about 5 and 50 square meters/gram and within this range surface areas between about 7 and about 15 square meters/gram have been found to be easily obtainable and quite useful for producing sintered composite ceramic bodies of the present invention.

The silicon carbide powder may contain minor amounts of impurities such as graphite, aluminum, boron or free silicon without deleterious effect; generally, a purity of greater than about 95 percent is required and a higher purity is desired. Acceptably pure silicon carbide powder is described in U.S. Pat. No. 4,123,286 to Coppola et al. Commercially available silicon carbide powder usually contains some uncombined carbon in the form of graphite, typically about one-half percent and up to 2 percent. The total graphite present should be adjusted accordingly to maintain the limits herein set forth. The amount of free silicon should be such that the raw batch does not contain more than about one percent of free silicon.

The silicon carbide powder may be doped with a sintering aid prior to its use in the invention. In this event, the amount of sintering aid subsequently added is accordingly adjusted downward or altogether eliminated. Pre-doping of the silicon carbide powder may be accomplished by adding a sintering aid during formation of the silicon carbide powder. The silicon carbide powder may also be doped after its formation by heating in the presence of a sintering aid.

B. Graphite Powder

The graphite starting material can be obtained from any of a variety of sources. Larger material can be ball milled until sufficient amounts of fine graphite powder are obtained and the proper size of graphite can be selected from the ball milled product by conventional means. A suitable graphite powder is known as Dixon Airspun Graphite available from Joseph Dixon Crucible Company of Jersey City, N.J. This product may be further reduced in particle size by processing it in a vibro-energy mill such as that available from SWECO for four hours using silicon carbide media in heptane. An especially preferred graphite is available from Lonza Incorporated, Fairlawn, N.J. under the name Lonza graphite grade KS 2.5. This powder has an average abailable particle size of about 2.5 microns and a surface area exceeding about 20 square meters/gram as determined by using nitrogen at 77° K. as the adsorbate. Its hydrophyllic (that is, easily wet with water when compared to other available graphites) nature facilitates processing. Suitable graphite powders have an average particle size not in excess of 8 microns, preferably not in excess of 5 microns, and more preferably from about 2 to about 4 microns, and most preferably less than 2 microns. It is difficult, however, to obtain accurate particle size distributions for graphite powders in the particle size range of interest and the surface area of the graphite particle is considered the more relevant characteristic in determining suitable material. Accordingly, suitable graphite particles are specified as having a surface area of at least about 5 square meters/gram, more preferably at least about 18 square meters/gram and most preferably at least 22 square meters/gram, but not exceeding 100 square meters/gram. The graphite powder should be at least of 95 percent purity and should not contain impurities as mentioned above with respect to the SiC powder which may interfere with sintering. Less desired are graphite materials containing carbon in other forms because these will result in a higher total carbon content for a given graphite content, thereby lowering the desirable properties of the resulting composite silicon carbide/graphite/carbon ceramic body that are derived from graphite.

C. Sintering Aid

Materials which react with the silicon carbide ceramic material at sintering temperatures to form a sintered product are utilized as sintering aids. Materials suitable for sintering aids are selected from the group consisting of boron, aluminum, beryllium or compounds containing any one or more of these or a mixture of any of the foregoing elements or compounds in the immediate presence of amorphous carbon. Nitrides and carbides of aluminum, boron and beryllium, as well as compounds of these such as aluminum diboride, are particularly useful as sintering aids.

The amount of sintering aid to be employed is best considered in relationship to the amount of silicon carbide present. The amount of sintering aid expressed as a molar ratio of the amount of elemental aluminum, boron or beryllium present relative to silicon carbide powder should be from about 0.006 to about 0.20. These amounts of sintering aid when expressed in term of percent of the weight of the raw batch are from about 0.15 to about 15 percent by weight of the raw batch ingredients. Thus, sintering aid should be present in a quantity sufficient to provide from about 0.15 to about 5.0 percent by weight of silicon carbide of elemental aluminum, boron or beryllium and preferably from about 0.30 percent minumum. When the sintering aid is present in an amount sufficient to yield greater than about 3 percent of weight of elemental aluminum, boron or beryllium, no further advantage has been identified regarding densification of the silicon carbide matrix and the excess sintering aid may be present in the final product as a distinct crystalline phase. Conversely, when less than 0.15 percent by weight of elemental aluminum, boron or beryllium is provided based on the weight of silicon carbide present, the desired densification of the silicon carbide/graphite composite to at least 75 percent of theoretical does not reliably occur when sintering is conducted in the absence of externally applied pressure. The best results with regard to densification are obtained with boron carbide ($B_4C$) as a sintering aid in quantities that result in sintered articles having a content of from about 0.3 to 3.0 percent by weight of boron. When boron is used, the optimum level in the sintered article is believed to be about 0.5 weight percent (2 mole percent). When aluminum is used, the optimum level is believed to be about 1.0 percent.

It has not been found necessary to increase the amount of sintering to counteract absorption by the graphite powder.

Boron and boron carbide are a particularly preferred sintering aids. Of these boron carbide is most preferred due to its lower cost and greater availability. Boron carbide is essentially a non-stochiometric material and various boron carbide materials having a molar ratio of boron to carbide between 8 to 1 and 2 to 1 have been reported. It is generally preferred to use boron carbide as the boron source and particularly a form of boron which is called "solid state reacted boron carbide" having a molar ratio of boron to carbon between about 3.5 to 1 and 4.1 to 1. Such a solid state reacted boron carbide can be produced in accordance with the process of U.S. Pat. No. 3,379,647 to P. A. Smudski. Boron carbides having a molar ratio of boron to carbide even greater than 4.1 to 1 are quite desirable but these materials are relatively less available and considerably more expensive and are, therefore, not preferred. The boron source can be crystalline or non-crystalline and preferably is particulate and of a size less than 30 microns. Within this limitation, it is preferred that the source be of a size ranging from about 0.1 to about 10 microns to facilitate forming a homogeneous mixture with the other component ingredients.

D. Carbon

As previously mentioned, carbon is also necessary to be present in an amorphous form in specified quantity at the commencement of sintering to yield highest densification. When it is desired to provide a mixture which can be pressureless sintered to greater than 96 percent of theoretical density, it is present in an amount from about 0.5 up to about 5 percent by weight of the batch. This amorphous carbon is best provided by use of an organic solvent soluble, organic material which can be coked at temperatures below about 1000° C. to form amorphous carbon. Particularly preferred materials are phenolic resins and coal tar pitch which have char yields of from about 40 to 60 percent, respectively, although any solvent soluble organic material, which can be coked to provide amorphous uncombined carbon having a carbon content of from about 25 to about 75 percent by weight is acceptable. From about 0.67 to about 17 percent by weight of such an organic solvent soluble organic material is employed in the raw batch. It is preferred that the organic material have a char yield of from about 33 to about 50 percent by weight and more particularly from about 40 to about 45 percent by weight. The most preferred amount of carbonized organic material in the sintered composite ceramic body is believed to be about 2 percent by weight and, thus, the optimum raw batch should contain about 5 percent by weight of an organic solvent soluble organic material having a char yield between about 40 and 45 percent by weight. Particularly useful are B-stage resole phenolic resins. Also useful, for example, are thermosetting resins, such as epoxy resins and phenol formaldehyde resins of the novolac type. A particularly good carbon source material is polyphenylene resin which provides a char yield up to 80 percent. Polyphenylene resins are available from Hercules, Incorporated, Wilmington, Del. Highly suitable resins are Plyophen TM 90-151, a phenol formaldehyde product available from Reichold Chemicals, Inc. White Plains, N.Y. and Resin 8121, a B-stage resole phenolic resin available from Varcum Chemical Company, Niagara Falls, N.Y.

Thermoplastic resins are not generally useful as primary sources of amorphous carbon because of their relatively low char yields. Additionally, such materials volatilize at baking temperatures of the present invention and, as a result, contribute little, if any, of the required amorphous carbon.

The necessary amorphous carbon may be supplied, in whole or in part, to the mixture in the form of particulate carbon black, for example acetylene black, advantageously having a surface area of between about 10 and about 400 square meters/gram. The use of carbon black is, however, not preferred due to handling inconvenience and greater difficulty in forming a homogeneous sinterable powder mix. A solvent or temporary binder is helpful when forming sinterable powders using carbon black as the source of amorphous carbon.

E. Temporary Binder

The raw batch may contain optionally a temporary binder to facilitate forming of a shaped green body from the raw batch which is to be thereafter sintered. The temporary binder may be employed up to about 25 percent by weight of the batch. Suitable temporary binders include polyvinyl alcohol, polyethylene glycol, coal tar pitch, long chain fatty materials such as oleic acid, metallic stearates such as oleic acid, metallic stearrates, polyolefins and mineral oils, sugars, starches, alginates and polymethyl phenylene. It is to be noted that the temporary binder, when present, may contribute to the quantity of carbon char (amorphous carbon) present in the batch and the total carbon present in a form other than graphite should be adjusted accordingly to maintain the limits herein set forth. An eminently suitable temporary binder is polyvinyl alcohol having associated therewith from about 5 to about 15 parts by weight of water per part of polyvinyl alcohol as a temporary binder vehicle. In particular, it is preferred to use about 10 parts by weight polyvinyl alcohol plus 90 parts by weight of water as a temporary binder vehicle.

2. Preparing the Raw Batch

A. Mixing

The process for producing a sintered silicon carbide/graphite/carbon composite ceramic body according to the present invention is illustrated schematially in FIG. 1. The process preferably begins with mixing together of the ingredients of the raw batch, namely from about 1 to about 48 percent by weight graphite, from about 0.67 to about 17 percent by weight of organic material which can be coked to yield amorphous carbon; from about 0.15 to about 15 percent by weight of a sintering aid; and optionally up to 25 percent by weight of a temporary binder with the balance being silicon carbide powder. The amount of free silicon in the raw batch should not exceed about one percent. If a temporary binder, such as polyvinyl alcohol including a quantity of water is employed, the first mixing step preferably includes stirring the powdered materials (silicon carbide, graphite, organic material and sintering aid) together with the temporary binder and temporary binder vehicle prior to adding an organic solvent in which the organic material is soluble. In any event, after the organic solvent is added, the raw batch and organic solvent should be stirred in such a way as to disperse the organic solvent soluble, organic material which can be coked about the silicon carbide of the raw batch suitably for at least about 5 minutes and preferably about 15 minutes. Alternatively, the ingredients may be dispersed by milling in a conventional ball mill or processing in a vibro-energy mill. Milling times up to 4 hours may have been employed without any negative effect on sintering (percent of theoretical density obtained). However, excessive milling may reduce the graphitic nature and should be avoided. When a temporary binder is not employed, the mixing or milling may be conducted in the presence of an organic solvent such as acetone or heptane.

Following this mixing step, the mixture is dried in conventional manner by any suitable technique such as passing a quantity of drying gas, such as nitrogen, through or near the stirred mixture or by pan or spray drying of the mixture.

Following this drying step, the dried mixture is preferably screened so it will pass a 40 mesh and preferably a 60 to 80 mesh sieve (U.S. Standard).

When the carbon-containing additive or source is amorphous carbon, the mixing is preferably carried out in the presence of a temporary binder that is advantageously first dissolved in an organic solvent such as acetone or an aliphatic alcohol or alkane containing up to 7 carbon atoms.

The graphite powder may, optionally, be added subsequent to the formation of a pre-mix which itself is formed by mixing together silicon carbide, amorphous carbon source, sintering aid, organic solvent and optionally temporary binder. The organic solvent is normally dried subsequent to formation of the pre-mix. The pre-mix is then broken up so it will pass a 40 mesh and preferably a 60–80 mesh U.S. standard sieve. If the pre-mix is not sufficiently broken up, upon shaping the resulting shaped body will not be sufficiently compacted and voids will result. Also, the graphite may not be homogenously distributed throughout the silscon carbide matrix. The graphite may be added prior to drying the pre-mix. When the graphite is added to the previously dried pre-mix, an organic solvent may also be added to facilitate formation of a homogeneous mixture. The solvent is removed prior to shaping in the manner previously described.

Sintering aid can also be added by using pre-doped silicon carbide powder, pre-doped graphite powder, or by introduction into the resin which is to be charred to form amorphous carbon or into a plasticizer or temporary organic binder. Sintering aid can also be introduced by firing of the body being sintered within a graphite container that has been saturated with sintering aid by previous exposure to sintering aid at or about the temperature of sintering. Sintering aid may also be introduced during sintering in the form of a gas. Combinations of these techniques may be employed.

The level of sintering aid is provided within the body being sintered may be maintained by assuring that the partial pressure of sintering aid in the sintering atmosphere is equal to or greater than that within the body being sintered. A practical way to accomplish this to enclose the body being sintered within a sealed container which is impervious to the aluminum, boron or beryllium of the sintering aid at sintering temperature and which has a volume approximating the size of the body being sintered. Alternate ways of introducing and maintaining an effective amount of sintering aid are described in U.S. Pat. No. 4,172,109 and 4,080,415 now U.S. Pat. No. Re.30,386.

B. Shaping

Following the drying and sieving steps, the dried mixture is shaped in such a way as to produce a shaped body preferably having a density of at least about 45 percent of theoretical and preferably between about 50 and about 65 percent of theoretical. This shaping can be accomplished by any of a variety of techniques which are in themselves known, for example by extrusion, injection molding, transfer molding, casting, cold pressing, isostatic pressing or by compression. When compression is used, suitable pressures are between about 8,000 and 25,000 psi and preferred pressures are between about 15,000 and 20,000 psi.

When a temporary binder is present, the temporary binder may be cured by heating the shaped body at an appropriate temperature below coking temperature for an appropriate time. This results in improved strength of the shaped body and thereby facilitates machining of the shaped body, if necessary, to attain the desired shape. For example, when the temporary binder is polyvinyl alcohol, it may be cured by heating the shaped body at a temperature of about 90° C. to about 150° C. for about 1 to about 2 hours. The shaped body may be easily machined, if desired, at this time.

C. Sintering

The shaped body is then fired to accomplish the densification necessary to produce a sintered silicon carbide/graphite/carbon composite ceramic body according to the invention. Firing takes place from about 20 to about 180 minutes at temperatures of from about 1900° to about 2300° C. Lower temperatures are generally inoperable and higher temperatures cause sublimation of the silicon carbide material. The firing step can be carried out in a batch furnace or in a tube furnace wherein the shaped body is passed through the hot zone of the tube furnace to have a residence time at the desired temperature and for the desired time. The details of such a tube furnace are known in the prior art and are described, for example, in U.S. Pat. No. 3,689,220 to P. A. Smudski. Firing is carried on in the absence of any externally applied pressure save that which may occur due to the presence of a gas at a pressure up to about one atmosphere. Such a firing or sintering process is referred to as being "pressureless". During pressureless sintering, the object being sintered is surrounded, usually in an inert container such as a graphite crucible, in up to about one atmosphere of pressure of an inert gas, a reducing gas, a vacuum or nitrogen. Reducing gases include hydrogen, and carbon monoxide. Inert gases include the rare gases such as argon, helium, and neon. The gases in which the sintering operation can be carried out thus include argon, helium, hydrogen, neon and nitrogen and mixtures of these. Nitrogen, when utilized, enters into reaction in a minor way with the silicon carbide raw material. The use of nitrogen raises the necessary temperature for sintering about 200° C. in comparison with processes utilizing inert gases such as argon, helium or neon. Nitrogen atomsphere is not recommended in combination with aluminum sintering aid because high density is not easily achieved. The firing can also be carried out under vacuum which, for purposes of this application, is defined as being 1 mm. of mercury or less.

Although the sintering process is not fully understood, it is believed that the driving force is the surface energy of the silicon carbide which decreases as a result of surface area decreasing as the fine particles weld together during firing. A pressureless-sintered body is one in which the sintering process is effected in the absence of any externally applied pressure save that which may occur due to the presence of a gas at a pressure up to about one atmosphere.

The presence of a continuous phase of silicon carbide in composite bodies according to the invention is evidenced by shrinkage of several volume percent which occurs during initial firing of a pre-shaped object at sintering conditions. The amount of shrinkage decreases as the amount of graphite added increases. When a continuous silicon carbide phase is not formed, as for example, when too much graphite is present, such shrinkage does not occur upon firing at sintering conditions. The absence of a continuous silicon carbide phase will also be evidenced by a composite body having a very low resistance to rupture.

The resulting sintering composite body may, and typically will, exhibit some open porosity.

As used herein, "open porosity" means that which is determined by water saturation (ASTM C20-74).

Various aspects of the invention will now be illustrated with several examples.

in a vacuum was as indicated in Table I. After sintering, the densified body was held for about 20 minutes in a cooling chamber to avoid thermal shock. After the sintered body had cooled, its physical and mechanical properties were observed to be as indicated in Table II.

Particulate carbon black known as Raven 1255 available from Cities Service, Columbian Chemical Division, Waltham, Mass. was used in the preparation of Sample number 17.

Samples 1 through 20 were prepared in substantially identical manner and show the effect of varying the type and amount of various ingredients. Sintering conditions were as nearly identical as possible to achieve with presently available equipment which consisted of an electrical resistance heated tube furnace as described in U.S. Pat. No. 3,689,220.

Samples 1 through 7 demonstrate the influence of various amounts of graphite while maintaining constant the amount and type of amorphous carbon source resin and the amount and type of sintering aid. When the

TABLE I

Figure 2:
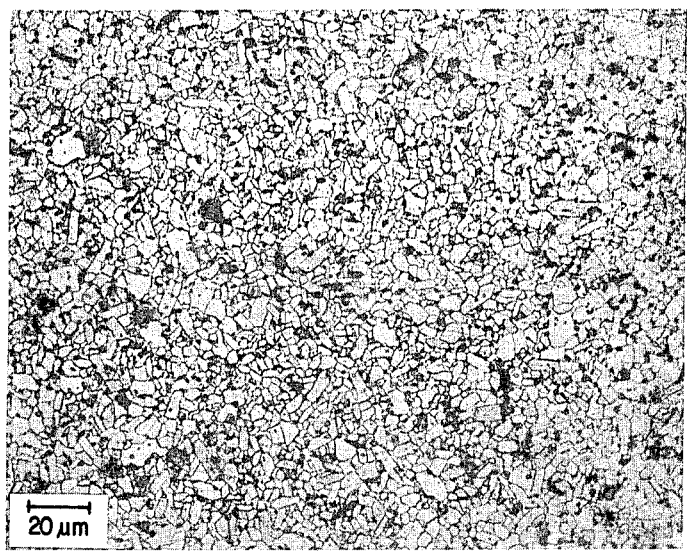
FIGS. 2, 4, 6, 8, 10–14 and 16–23 show at a magnification of 500 times, microstructures resulting from sintering at 2150° C. for 30 minutes in argon of bodies having, by calculation and formulation, compositions as given in Table I.
Figure 3:
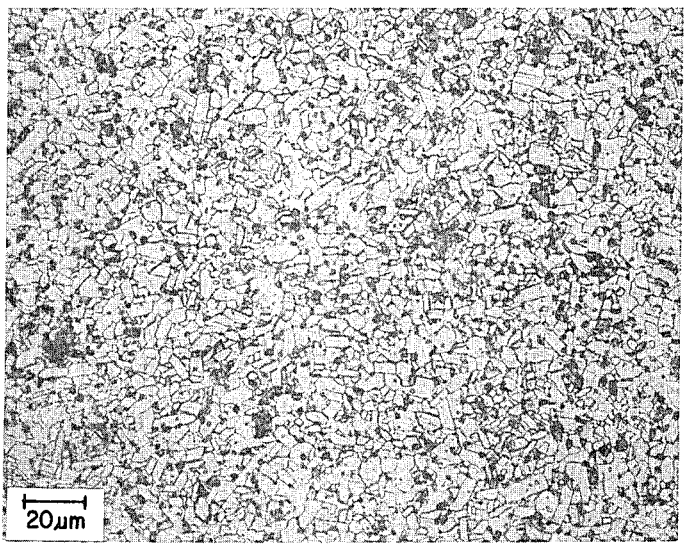
FIGS. 3, 5, 7, 9 and 15 show at a magnification of 500 times, microstructure of compositions as given in Table I resulting from sintering at 2150° C. for 30 minutes in argon followed by cooling to ambient and subsequently heating to and maintaining at 2150° C. for one hour in argon.
Figure 4:
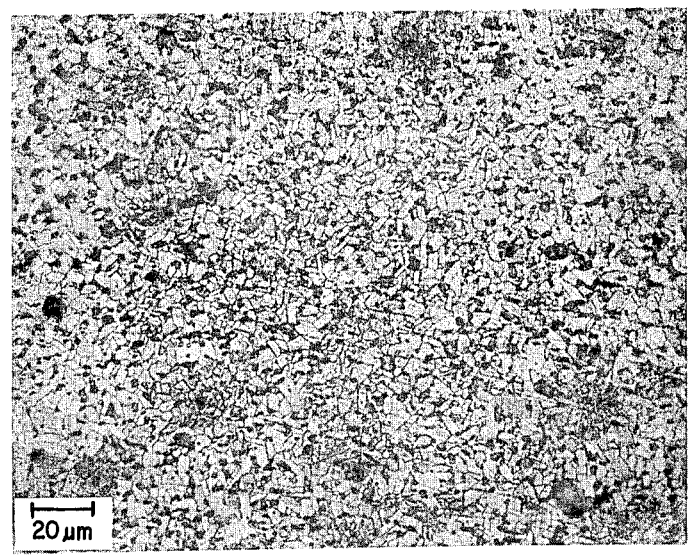
Figure 5:
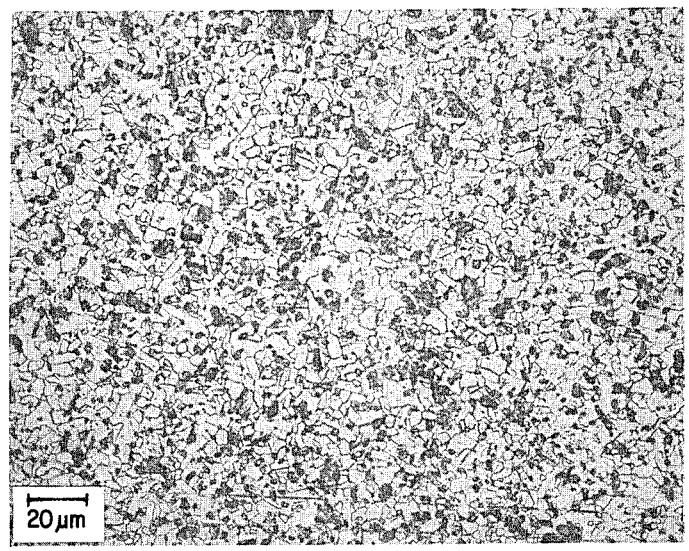
Figure 6:
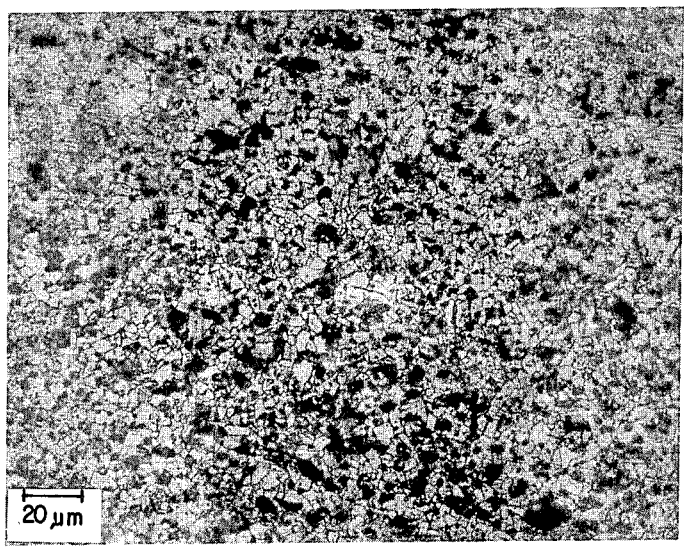
Figure 7:
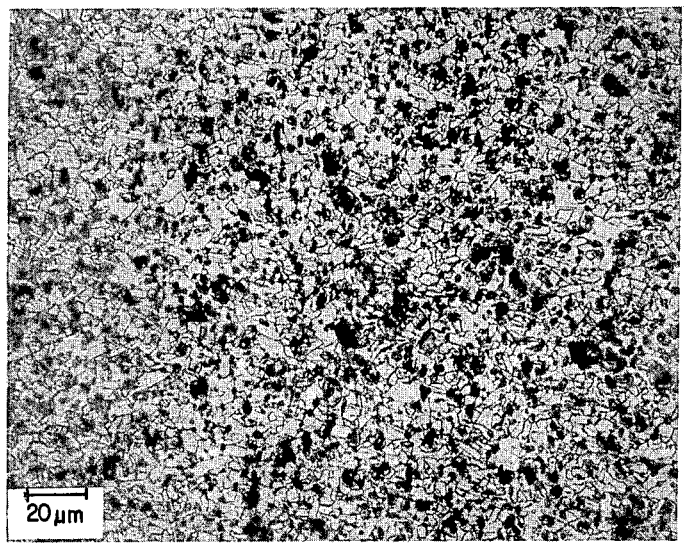
Figure 8:
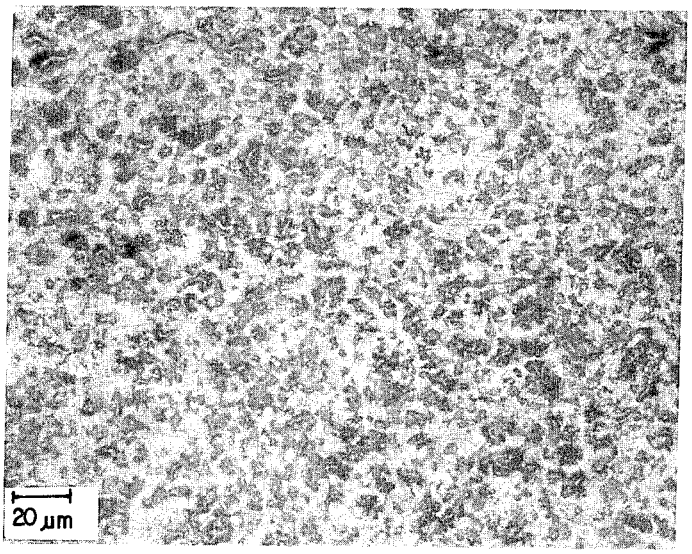
Figure 9:
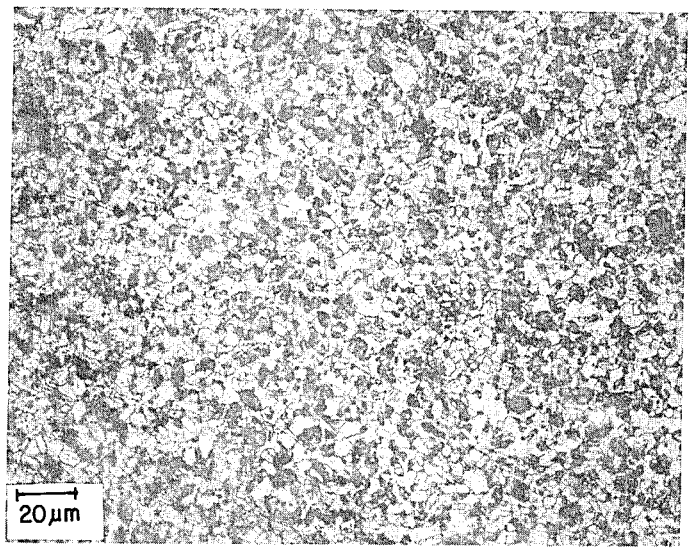
Figure 10:
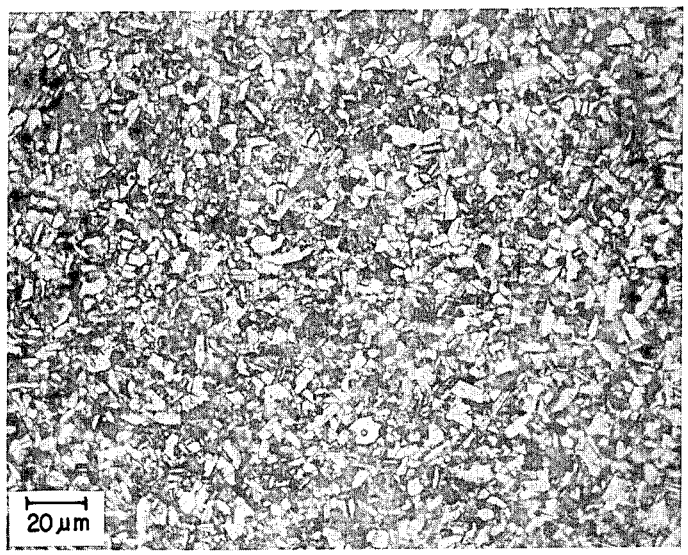
Figure 11:
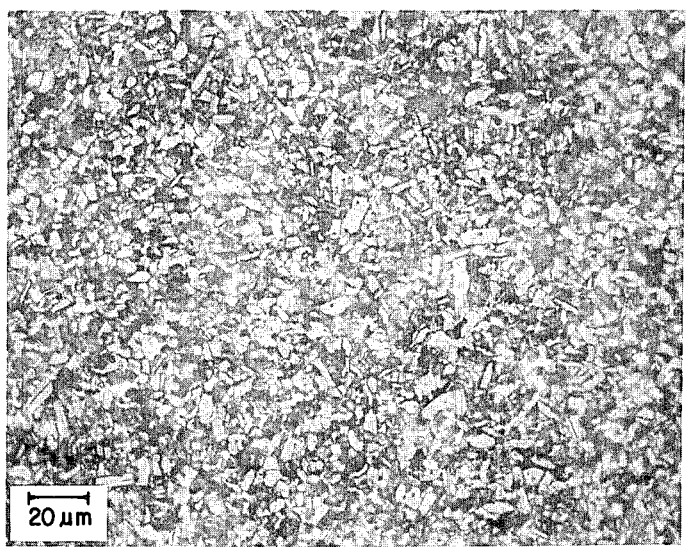
Figure 12:
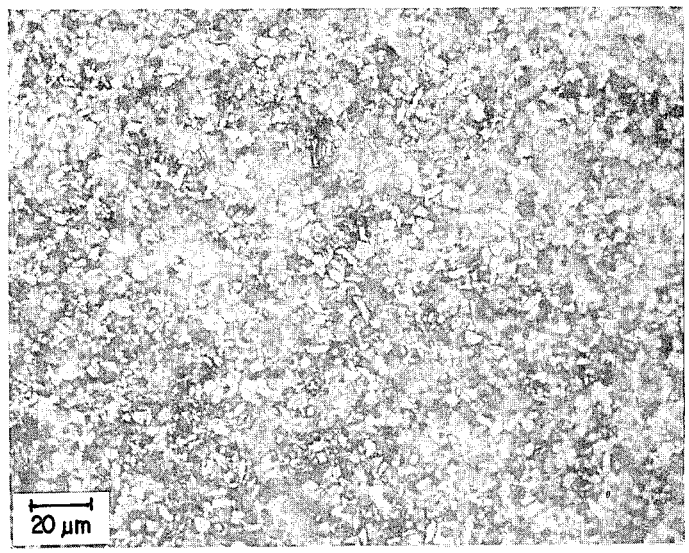
Figure 13:
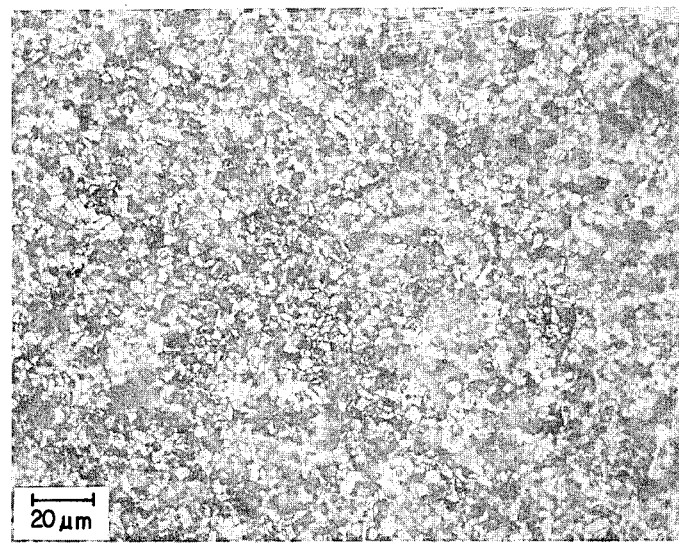
Figure 14:
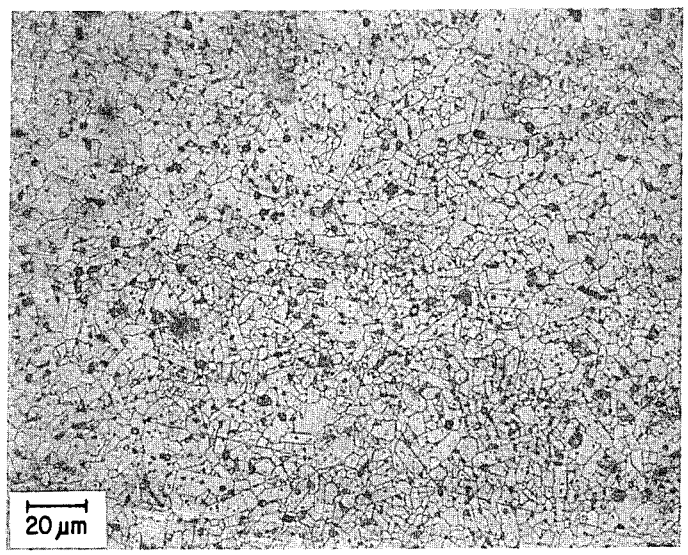
Figure 15:
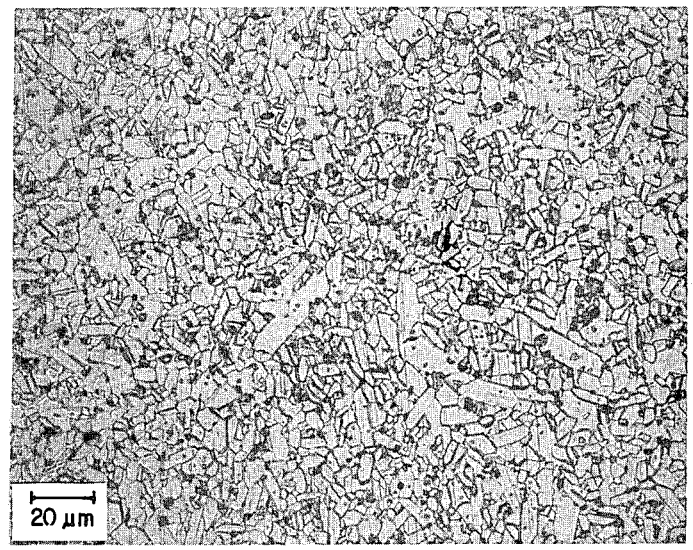
Figure 16:
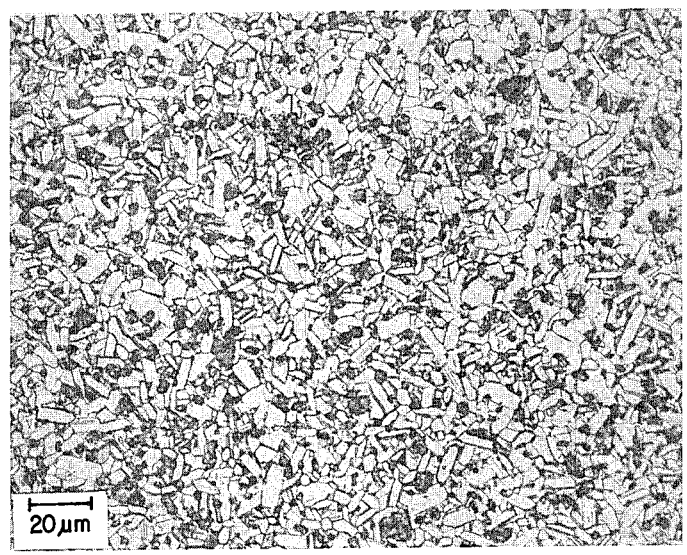
Figure 17:
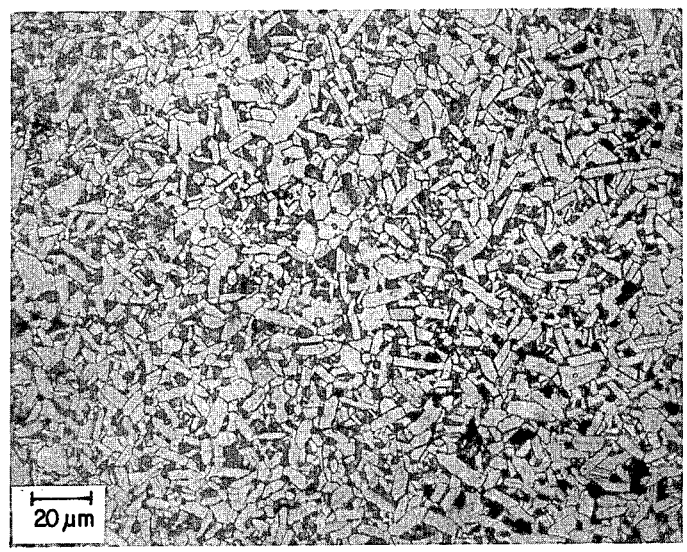
Figure 18:
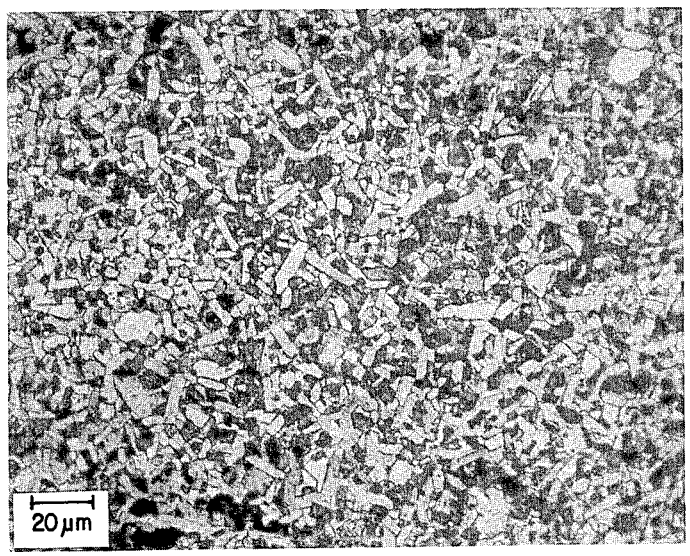
Figure 19:
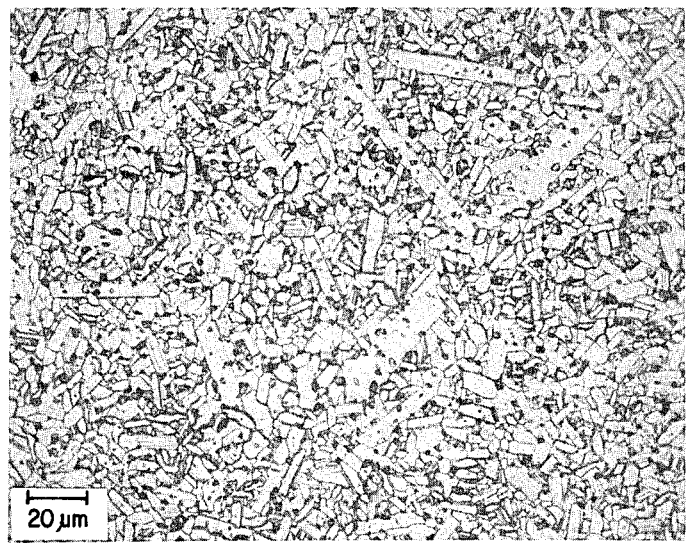
Figure 20:
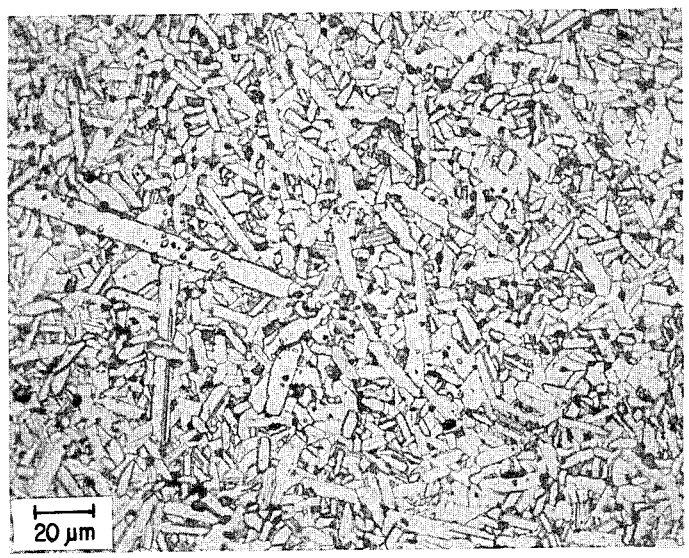
Figure 21:
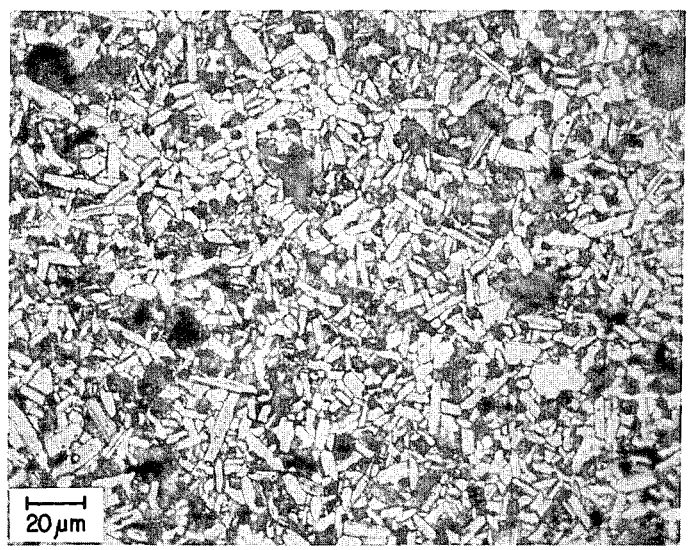
Figure 22:
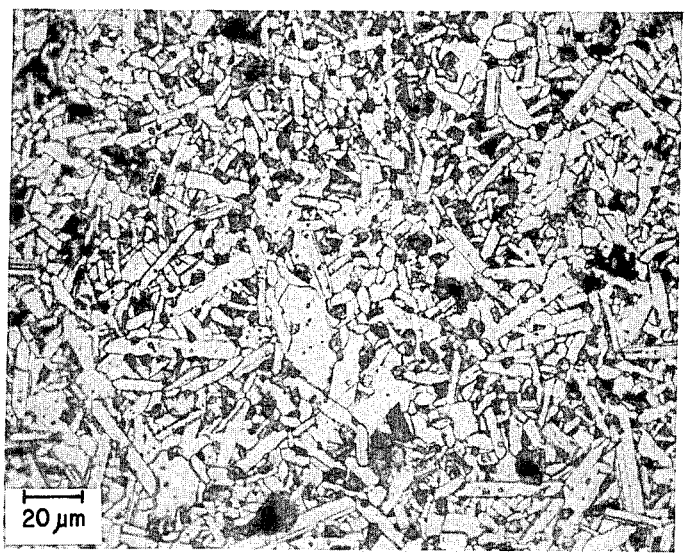
Figure 23:
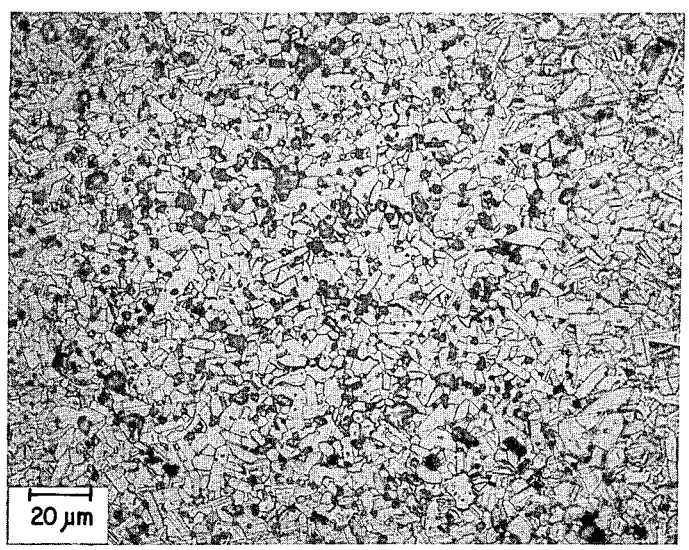

| Sample No. | Carbon/Source (net wgt. %) | | Graphite (wgt. %) | Sintering Aid (wgt %) | Silicon Carbide (wgt. %) | Sintered in Argon at 2150° C. for 30 min. | Reheat in Argon at 2150° C. for 1 hr. |
| --- | --- | --- | --- | --- | --- | --- | --- |
| 1  | 2   | plyophen 90-151 | 1.5 | 0.5 | (net B from B$_4$C) | 96.0 | FIG. 2  | FIG. 3 |
| 2  | 2   | "  | 3.0 | 0.5 | "  | 95.5 | FIG. 4  | FIG. 5 |
| 3  | 2   | "  | 4.5 | 0.5 | "  | 93.0 | FIG. 6  | FIG. 7 |
| 4  | 2   | "  | 8.0 | 0.5 | "  | 89.5 | FIG. 8  | FIG. 9 |
| 5  | 2   | "  | 18  | 0.5 | "  | 79.5 |         |        |
| 6  | 2   | "  | 38  | 0.5 | "  | 59.5 |         |        |
| 7  | 2   | "  | 48  | 0.5 | "  | 49.5 |         |        |
| 8  | 2   | "  | 5.0 | 0.5 | "  | 92.5 | FIG. 10 |        |
| 9  | 2   | "  | 5.0 | 1.0 | "  | 92.0 | FIG. 11 |        |
| 10 | 2   | "  | 5.0 | 5.0 | "  | 88.0 | FIG. 12 |        |
| 11 | 2   | "  | 5.0 | 10  | "  | 83.0 | FIG. 13 |        |
| 12 | 2   | "  | 0   | 0.5 | "  | 97.5 | FIG. 14 | FIG. 15 |
| 13 | 1   | "  | 1   | 0.5 | "  | 90.5 | FIG. 16 |        |
| 14 | 0.5 | "  | 1.5 | 0.5 | "  | 97.5 | FIG. 17 |        |
| 15 | 0   | "  | 2.0 | 0.5 | "  | 97.5 | FIG. 18 |        |
| 16 | 5   | "  | 0   | 0.5 | "  | 94.5 | FIG. 19 |        |
| 17 | 2   | Raven 1255 | 0 | 0.5 | " | 97.5 | FIG. 20 |        |
| 18 | 2   | B 178 | 8.0 | 2.0 | wgt % AlB$_2$ | 88.0 | FIG. 21 |       |
| 19 | 10  | "  | —  | 2.0 | wgt % AlB$_2$ | 88.0 | FIG. 22 |       |
| 20 | 2   | "  | —  | 5.0 | (from B$_4$C) | 93.0 | FIG. 23 |       |

EXAMPLES 1-20

Silicon carbide powder having a specific surface area of 8-12 square meters/gram, graphite powder known as KS 2.5 from LONZA having a specific surface area of 20 square meters/gram, a sintering aid as indicated in Table I, and Plyophen TM 90-151 phenol-formaldehyde resin available from Reichold Chemicals Inc. or Varcum 8121 Resin available from Varcum Chemical Company, Niagara Falls, N.Y., a division of Reichold Chemicals Inc., were mixed together and milled for 4 hours utilizing a ball mill having a plastic vessel containing silicon carbide grinding media in acetone or heptane. The milled mixture was dried and thereafter sieved through an 80 mesh U.S. Standard Sieve. At the end of the drying step there was only a faint trace of solvent smell and the material was dry to the touch. A portion of the dry raw batch powder was compressed at 15,000 psi to achieve a green density above 50 percent. After pressing into a shaped body, the shaped body was placed on a graphite setter tile. The shaped body was fed into a previously used tube furnace having a hot zone maintained at the temperature indicated in Table I below at a rate of about ¼ to ½ inches per minute so that the required time to traverse the hot zone of the furnace was as given in the following tables. The sintering atmosphere, whether an inert gas at the pressure specified or microstructures of these as shown in FIGS. 2-9 are compared with one another and with sample 12 as shown in FIGS. 14 and 15, it is seen that inclusion of the graphite powder in combination with resin carbon source in the raw batch results in a finer microstructure. Also, when Samples 1-4 as shown in FIGS. 3, 5, 7 and 9 are compared to sample 12 as shown in FIG. 15 after reheating and maintaining them at 2150° C. for one hour in Argon, it is observed that less grain growth occurs in those samples containing the addition of graphite powder as well as resin carbon source.

Examples 8-11 were prepared in a fashion identical to that of Examples 1-7, respectively, and demonstrate the influence of varying the level of B$_4$C sintering aid at a constant carbon source resin and constant graphite powder level. As shown in FIGS. 10-13 respectively, increasing the level of sintering aid so as to provide boron in amounts from 0.5 to 10.0 weight percent has very little influence on the grain size and aspect ratio of the resulting microstructure.

Samples 12-15 and 17 demonstrate the influence of varying the amount of carbon source resin and graphite or other carbon source while maintaining total carbon content at two percent and at constant sintering aid type and amount. As shown in FIGS. 14-18 respectively, and in Table II the grain size and aspect ratio was not greatly influenced at these low total carbon levels; however, the inclusion of graphite in each instance lowered the average grain size. As shown in FIG. 20 and Table II, the use of a non-graphite particulate carbon source alone resulted in an obviously coarser microstructure.

The influence of the type of carbon added to the raw batch at a higher total carbon content is demonstrated by Samples 2 and 16. Samples 2 and 16 were prepared in identical fashion and have the same 5 percent total carbon level but in different forms due variation of the raw batch. Sample 2 was prepared using a combination of carbon source resin and graphite whereas Example 16 was prepared using only carbon source resin. The resulting sintered bodies exhibit significantly different microstructures. The microstructure obtained at identical firing conditions for Sample 2 (FIG. 4) is much finer than that obtained for Sample 16 (FIG. 19). Even after reheating and maintaining at 2150° C. in Argon for one hour, Sample 2 exhibits a microstructive that is finer (FIG. 5) than that of Sample 16.

Samples 4, 18 and 19 have the same total carbon level and demonstrate the combined influence of the type and amount of sintering aid as well as that of carbon from resin as contrasted with carbon from graphite. A comparison of FIGS. 8-9 with FIG. 21 indicates that $AlB_2$ at two weight percent (net B content of 0.84) yields a much coarser structure than $B_4C$ at 0.64 weight percent (weight fraction of B in $B_4C$ is 0.78). A comparison of FIGS. 18 and 19 indicates that a mixture of carbon from resin source and graphite yields a finer microstructure than use of carbon from resin alone at the same total carbon level and the same level of $AlB_2$, although the effect is greatly diminished compared to the result when $B_4C$ is used.

Samples 3 and 8, differ only slightly in the amount of grahite powder used. This one-half percent difference at a nominal graphite level of 5 percent is not considered to be significant. The differences observed for the resulting sintered composite bodies are believed primarily due to processing differences that are not easily controlled, particulary the mixing and sintering steps, and therefore represent variations which may occur. As indicated in Table II, the average grain size and average aspect ratio for samples 3 and 8 are similar. The difference in appearance of the photomicrographs FIGS. 6 and 7 is due to differences in preparation of the samples for microscopy (e.g. how they were polished, whether or not they were thermally etched). Close examination reveals that a similar microstructure exists, although the thermal etch technique used for FIG. 6 gives a first glance impression of a much finer microstructure due to more markings on individual grains.

A comparison of the results obtained with respect to samples 12 and 20 ( FIGS. 14-15 and 23 respectively) indicates that changing the amount of $B_4C$ sintering aid from 0.5 to 5.0 percent does not significantly change the resulting microstructure.

Electrical resistivity of samples 1-20 was measured on bars of the same size and configuration ($2 \times \frac{1}{4} \times \frac{1}{8}$ inches) with metallized ends. The results given in Table II indicate that small graphite additions to the raw batch greatly influence the resistivity of the sintered product. It is unexpected that relatively small increases in the amount of added graphite would effect large decreases in electrical resistivity as demonstrated by samples 1-5 and that the relationship is clearly non-linear. Increasing the amount of sintering aid at a constant graphite level also reduces resistivity, although much less dramatically than increasing graphite level (Samples 8-11).

Because a laboratory measurement of electrical resistivity is greatly influenced by the quality of the junctions of the metallic conductors to the samples, this method of determining electrical resistivity is not deemed to be as accurate as a determination based on the ability to electrical-discharge machine a sample of a sintered article.

Attempts were made to electrical-discharge machine Sample Nos. 1 and 8-12. The results are reported in Table II. The reason for the poor performance of sample 8 is unknown in view of sample 1 providing fair performance. The comparative performance of samples 12 and 15 establishes that graphite aids in rendering sintered silicon electrical-discharge machineable while the use of a resin carbon source in combination with graphite, for example, Sample 1, yields a composite product that may be electrical-discharge machined while also having a very fine grain microstructure, high density and MOR.

The fracture toughness of samples 1-4 and 8 exceeds that of sample 12.

Sonic modulus (determined by an ultrasonic method) decreases with increasing graphite amount as indicated upon comparison of samples 1-6.

"Grain size", as the term is used herein, means the maximum length straight line that can be contained within the borders of a grain as it appears on plane surface of a polished specimen or a photomicrograph of such a specimen.

"Average grain size", as the term is used herein, means the arithmetic mean grain size of those grains observed on microscopic examination of a photomicrograph of a polished specimen of interest. Average grain size as reported in Table II was determined by the following linear intercept procedure.

A standard of known length is placed on a photomicrograph of the sample. The number of grains intercepted by the reference edge of the standard is determined. The length of the standard is divided by the number of grains. This quotient is then divided by the magnification to yield directly the average grain size in microns. A plurality of lines are used and averaged to neutralize any directionality.

"Aspect ratio," as the term is used herein, means the ratio of the maximum lineal dimension of a grain of the crystal microstructure to the minimum lineal dimension of a grain of the crystal microstructure. A spherical grain would have an aspect ratio of 1. The product of the present invention is characterized in part by its silicon carbide matrix being formed predominantly of grains that have an aspect ratio of less than about 3.

"Average aspect ratio" as reported in Table II was determined by dividing the photomicrograph format into an eight by ten matrix of equally-sized squares. Random numbers were then generated for these squares and employed to choose five squares. A template of the size of the photomicrographs was provided with this matrix. For each chosen square, a circle of the maximum size capable of fitting within one square was cut resulting in a template having five equal-sized randomly chosen holes. The template was placed on each photomicrograph and each of the exposed areas examined under magnification. For each of the five circles, the worst case grain which extended into or was contained within was singled out and its aspect ratio determined. For each of the five circles, a typical grain exclusive of the worst grain was selected and its aspect ratio determined. The results reported in Table II represent the average of the five worst case grains and five typical grains selected for each sample's photomicrograph. Thus, the values given are weighted toward the worst case for each sample. "Average aspect ratio" is not to be confused with or substituted for "aspect ratio" in interpreting the following claims.

Modulus of Rupture (MOR) was determined using a four-point bending technique employing a long span of 1½ inches and a short span of ½ inch (ASTM C651-70). The test bars were of $2 \times \frac{1}{4} \times \frac{1}{8}$ inches size.

EXAMPLES 21-28

Samples 21 through 25 were prepared in substantially identical manner and again show the effect of varying the level of graphite powder in the raw batch. The ingredients of the type and amount given in Table III were mixed by milling them for four hours in a ball mill having a plastic vessel containing silicon carbide grinding media in acetone. The green bodies were formed by pressing them at 15,000 psi and thereafter sintered in a tube furnace under the conditions indicated in Table III.

Samples 26, 27 and 28 were prepared in a fashion identical to that of Samples 21, 24 and 25, respectively, excepting that the powders prior to addition of the carbon source resin were milled for four hours in heptane utilizing silicon carbide media in a Sweco vibro-energy mill. Thereafter, the milled powders were dried at room temperature. Thereafter, the carbon source in the form of Varcum 8121 resin was added to the mixture which was then milled for 1 hour utilizing silicon carbide media in a ball mill having a plastic vessel mill. After milling, the raw batch was dried at room temperature and sieved through an 80 mesh U.S. Standard Sieve and thereafter pressed into shaped bodies in a manner identical to that employed for Samples 21 through 25. The result was a reduction in the percentage of theoretical density obtained after sintering, particularly at higher levels of graphite. A corresponding increase in open porosity was also observed. This demonstrates that pre-milling of the silicon carbide and graphite powder and sintering aid is not necessary prior to the addition of the carbon resin source.

TABLE II

| SAMPLE NO. | DENSITY G/CC % OF THEORETICAL | FRACTURE TOUGHNESS (MPa · m^½) | SONIC MODULUS (psi × 10^6) | RESISTIVITY (ohm · cm) | MOR (psi × 10^3) | OPEN POROSITY (%) | OPEN PORE RADIUS (micron) | MICROSTRUCTURE AVG GRAIN SIZE μm / AVG ASPECT RATIO Orig. | Reheat | ELECTRICAL DISCHARGE MACHINABILITY |
|---|---|---|---|---|---|---|---|---|---|---|
| 1 | 3.126 97.94 | 3.42 ± 0.11 | 55.41 | 186 | 50.03 | 1.15 | not detected | 2.7 1.6 | 2.9 2.2 | fair |
| 2 | 3.074 96.99 | 3.46 ± 0.16 | 50.87 | 77.5 | 39.39 | 1.23 | not detected | 2.7 2.3 | 3.2 1.4 | |
| 3 | 3.001 96.99 | 4.23 ± 0.14 | 47.8 | 2.94 | 46.26 | 0.81 | not detected | 2.4 1.8 | 2.4 1.9 | |
| 4 | 2.793 89.99 | 4.18 ± .04 | 36.85 | 0.0485 | 28.16 | 8.6 | 0.025–0.075 max @ 0.035 | 2.7 — | 2.6 1.7 | |
| 5 | 2.320 77.83 | 2.48 ± 0.3 | 17.04 | 0.00648 | | 21.6 | 0.125–0.165 max @ 0.14 | | | |
| 6 | 1.750 63.35 | crushed due to very porous surface | 2.53 | .00371 | | | | | | |
| 7 | 1.698 63.72 | crushed due to very porous surface | 18.30 | .00326 | | | | | | |
| 8 | 3.030 96.52 | 4.79 ± 0.23 | 48.27 | 1.51 | | 0.05 | | 2.7 1.9 | | poor |
| 9 | 3.030 96.38 | 3.57 ± 0.10 | 49.39 | 1.73 | | 1.18 | | 3.0 1.8 | | fair |
| 10 | 2.927 94.76 | 4.29 ± 0.13 | 46.00 | 0.433 | | 4.1 | | 3.3 1.8 | | good |
| 11 | 2.839 93.45 | 4.51 ± 0.13 | 43.9 | 0.277 | | 4.96 | | 3.1 — | | |
| 12 | 3.174 98.86 | 3.07 ± 0.26 | 53.29 | 20.7 | | 0 | none detected | 4.0 2.1 | 4.0 2.0 | unworkable |
| 13 | 3.151 98.58 | 3.42 ± 0.07 | 66.17 | 24.53 | | 0.07 | | 3.0 3.3 | | |
| 14 | 3.148 98.66 | 2.87 ± 0.09 | 41.95 | 1050 | | 0.12 | | 3.4 3.1 | | |
| 15 | 3.057 96.04 | 3.33 ± 0.17 | 52.98 | 7.95 | | 0.08 | | 3.5 3.0 | | poor |
| 16 | 3.053 95.09 | 3.07 ± 0.22 | 57.49 | 16.94 | | 0.05 | | 4.2 2.2 | | |
| 17 | 3.158 98.37 | 3.23 ± 1.10 | 63.64 | | | 0.07 | | 4.8 2.7 | | |
| 18 | 2.797 90.08 | 4.10 ± 0.13 | 38.01 | .0610 | | 0.76 | | 4.4 3.9 | | |
| 19 | 2.953 95.69 | 3.87 ± 0.24 | 45.39 | 0.60 | | 0.20 | | 4.3 3.1 | | good |
| 20 | 3.107 98.94 | | | 27,000 | | 0.01 | | 3.7 2.5 | | |

TABLE III

| | Sample No. | | | | | | | |
|---|---|---|---|---|---|---|---|---|
| | 21 | 22 | 23 | 24 | 25 | 26 | 27 | 28 |
| SiC | | | | | | | | |
| amount (%) | 97.6 | 96.6 | 95.6 | 94.6 | 89.6 | 97.6 | 94.6 | 89.6 |
| surface area ($m^2$) | — | — | — | — | — | — | — | — |
| Graphite | | | | | | | | |
| amount (%) | 0 | 1.0 | 2.0 | 3.0 | 8.0 | 0 | 3.0 | 8.0 |
| surfact area ($m^2$) | — | — | — | — | — | — | — | — |
| Carbon (amorphous) amount (%) from Varcum 8121 resin | 2.0 | 2.0 | 2.0 | 2.0 | 2.0 | 2.0 | 2.0 | 2.0 |
| Total Carbon amount (%) | 2.0 | 3.0 | 4.0 | 5.0 | 10.0 | 2.0 | 5.0 | 10.0 |
| Sintering Aid | | | | | | | | |
| net amount (%) Boron | 0.4 | 0.4 | 0.4 | 0.4 | 0.4 | 0.4 | 0.4 | 0.4 |
| type | $B_4C$ | $B_4C$ | $B_4C$ | $B_4C$ | $B_4C$ | $B_4C$ | $B_4C$ | $B_4C$ |
| Theoretical density (g/cc) | 3.175 | 3.161 | 3.148 | 3.135 | 3.071 | 3.175 | 3.135 | 3.071 |
| Green density (g/cc) | 1.777 | 1.776 | 1.774 | 1.776 | 1.770 | 1.77 | 1.76 | 1.72 |
| % of theoretical | 56 | 56 | 56.3 | 56.7 | 57.6 | 57.7 | 56.1 | 56.0 |
| Cured density (g/cc) | 3.074 | 3.044 | 3.016 | 2.979 | 2.563 | 3.052 | 2.799 | 2.510 |
| % of theoretical | 96.8 | 96.3 | 95.8 | 95.0 | 83.5 | 96.1 | 89.3 | 81.7 |
| Cured porosity (%) | 0.04 | .92 | 1.68 | 2.00 | 14.7 | 1.69 | 9.93 | 17.6 |
| Sintering temperature (°C.) | 2050 | 2050 | 2050 | 2050 | 2050 | 2050 | 2050 | 2050 |
| Sintering Time (minutes) | 120 | 120 | 120 | 120 | 120 | 120 | 120 | 120 |
| Sintering atmosphere at 1 atm. pressure | Ar | Ar | Ar | Ar | Ar | Ar | Ar | Ar |

Circular mechanical seals were prepared having compositions corresponding to those of sample numbers 1, 3, and 12. These were of 25.4 mm. diameter and were tested using water at a pressure of 138 KPa at a temperature of 26° C. A spring was employed to apply a load of 55.6N to the opposed seal faces. The values reported in Table IV are for 6 meters per minute sliding velocity which corresponds to a driven shaft speed of 4500 revolutions per minute with the rotating face and stationary face each being of the same material within any experiment. The data given in Table IV show that seals of silicon carbide/graphite/carbon composite have a shorter break-in period than a seal that is not of such a composite. Break-in period is the time required for the power dissipation level to equilibrate at its lowest value.

TABLE IV

| Composition Corresp. to Sample Number | Pre-run Surface finish (microns) | After run surface (microns) | Maximum power dissipation (watts) | Break-in period (hours) |
|---|---|---|---|---|
| 12 | 2.75 | 0.5 | 43 | 12 |
| 1 | 3.75 | 1.5 | 40 | 7.8 |
| 3 | 3.25 | 1.5 | 43 | 3.4–7.4 |

In Table V, the performance of a mechanical seal in which both parts are of a composition corresponding to sample number 12 is compared to a mechanical seal in which one part is of a composition corresponding to sample number 12 and the other part is of a composition corresponding to sample number 8. Seals of 25.4 mm. diameter were used. The operating conditions were as follows: water at 26° C. and at pressure of 138 KPa spring load of 55.6N. The power dissipation value observed for operating a seal in which both parts were of a composition corresponding to sample number 12 was arbitrarily given a value of 1.0. The values reported for the other tests are presented as a ratio to this control. The data clearly shows a lower level of power dissipation at sliding velocities of 2, 4 and 6 m/sec. when one of the seal parts is a composite according to the invention.

TABLE V

| Composition part/part | Relative Power Dissipated At | | |
|---|---|---|---|
| | 2 m/sec. | 4 m/sec. | 6 m/sec. |
| 12/12 | 1.0 | 2.1 | 3.7 |
| 12/8 | 0.6 | 1.5 | 2.2 |

In Table VI, the values observed for static or startup friction seals of various compositions are given. These values are believed to be of interest with respect to anticipated service conditions in which attempts are made to dry start a previously operated pump. The graphite-containing composites provide lower resistance to dry startup than pressureless sintered silicon carbide not containing added graphite. The values presented in Table VI were obtained using a velocity of 0.8 m./sec.

TABLE VI

| Composition Equivalent to Sample part/part | Startup Friction Coefficient |
|---|---|
| 12/12 | 0.165 |
| 1/1 | 0.145 |
| 3/3 | 0.159 |

Startup friction of samples according to invention was lower.

We claim:

1. A pressureless-sintered silicon carbide/graphite/carbon composite ceramic body essentially free of uncombined silicon consisting essentially of:
   (a) from about 1 to about 48 percent by weight of graphitic elemental carbon and having a total uncombined carbon content of from about 1.5 to about 49 percent by weight;
   (b) an effective amount of sintering aid;
   (c) the balance being silicon carbide;
   the composite body having a homogeneous fine grain microstructure of silicon carbide grains and graphite grains with at least 50 percent of its silicon carbide grains on an area basis having a size not exceeding about 8 microns and an aspect ratio less than about 3, the body having a density of at least 75 percent of theoretical density based on the law of mixtures.

2. A sintered composite body according to claim 1 having from about 1 to about 13 percent by weight of graphitic carbon, said body having a total uncombined carbon content of from about 1.5 to about 15 percent by weight; from about 0.15 to about 5 percent by weight of boron, aluminum or beryllium or a mixture of these.

3. A sintered composite body according to claim 2 having a microstructure in which the average size of the graphite grains is 5 or less microns and the average size of the silicon carbide grains is 5 or less microns.

4. A sintered composite body according to claim 2 in which the graphite grains have a maximum size of about 5 microns and an average size of about 2 to about 4 microns.

5. A sintered composite body according to claim 2 having a density of at least 80 percent of theoretical density of the composite.

6. A sintered composite body according to claim 2 having a density of at least 90 percent of theoretical density of the composite.

7. A sintered composite body according to claim 2 having a microstructure with at least 75 percent of its silicon carbide grains on an area basis having a size between about 2 and about 4 microns.

8. A sintered composite body according to claim 2 having a microstructure with at least 90 percent of its silicon carbide grains on an area basis having a size between about 2 and about 5 microns.

9. A sintered composite body according to claim 1 having a microstructure in which the average size of the graphite grains does not exceed that of the silicon carbide grains.

10. A sintered composite body according to claim 1 having a microstructure in which the average size of the graphite grains is about equal to the average size of the silicon carbide grains.

11. A sintered composite body according to claim 1 produced by pressureless sintering at a temperature of from about 1900° to about 2300° C.

12. A sintered composite body according to claim 1 having a microstructure with at least 75 percent of its silicon carbide grains on an area basis having a size not exceeding about 5 microns.

13. A sintered composite body according to claim 1 produced by pressureless sintering, at a temperature of from about 1900° C. to about 2300° C., a pre-shaped object having a density before pressureless sintering of at least about 45 percent of theoretical density of the composite, the pre-shaped object comprising:
  i. from about 1 to about 48 percent by weight graphite having a surface area of at least about 5 sq. meters/gram and an average particle size not exceeding about 8 microns;
  ii. from about 0.67 to about 17 percent by weight of an organic solvent soluble, organic material, which can be coked to provide uncombined carbon having a carbon yield of from about 0.5 to about 5 percent by weight;
  iii. from about 0.15 to about 15 percent by weight of a sintering aid selected from the group consisting of boron, aluminum and beryllium or compounds containing any one or more of these elements or a mixture of any of the foregoing elements or compounds, said sintering aid containing from about 0.15 to about 5 percent by weight of boron, aluminum or beryllium or a mixture of any of these;
  iv. from about 0 percent to about 25 percent by weight of temporary binder; and
  v. the balance being silicon carbide having a surface area of from about 5 to about 100 sq. meters/gram.

14. A sintered composite body according to claim 13 wherein the silicon carbide of the pre-shaped object is predominately by weight alpha, non-cubic crystalline silicon carbide.

15. A sintered composite body according to claim 13 containing at least 1 percent by weight of uncombined carbon in a form other than graphite.

16. A sintered composite body according to claim 13 having a density of at least 90 percent of theoretical density of the composite.

17. A sintered composite body according to claim 13 having a microstructure in which the average size of the graphite grains is not greater than about equal to the average size of the silicon carbide grains.

18. A sintered composite body according to claim 13 having a microstructure in which the average size of the graphite grains is 5 or less microns and the average size of the silicon carbide grains is 5 or less microns.

19. A sintered composite body according to claim 13 in which the graphite grains have a maximum size of about 5 microns and an average size of about 2 to about 4 microns.

20. A sintered composite body according to claim 13 having a microstructure with at least 75 percent of its silicon carbide grains on an area basis having a size not exceeding about 5 microns.

21. A sintered composite body according to claim 13 having a microstructure with at least 75 percent of its silicon carbide grains on an area basis having a size between about 2 and about 4 microns.

22. A sintered composite body according to claim 13 having a microstructure with at least 90 percent of its silicon carbide grains on an area basis having a size between about 2 and about 5 microns.

23. A sintered composite body according to claim 13, wherein the total uncombined carbon content is not less than 2.0 but not in excess of 10.0 percent by weight, the body containing from about 0.5 to about 2.0 percent by weight uncombined carbon derived from in situ carbonization of organic material.

24. A process for producing a sintered silicon carbide/graphite/carbon composite ceramic body comprising the steps of:
  a. forming a homogeneous mixture comprising the components of
    1. from about 1 to about 48 percent by weight graphite powder having an average particle size not in excess of about 8 microns and a surface area of at least about 5 square meters per gram;
    2. a carbon-containing additive selected from the group consisting of amorphous carbon, and a solvent soluble, organic material which can be coked at temperatures below about 1000° C. to form amorphous carbon, or mixtures thereof, in an amount between 0.5 and 5 percent by weight of the homogeneous mixture of uncombined carbon;
    3. from about 0.15 to about 15 percent by weight of a sintering aid selected from the group consisting of aluminum, beryllium or boron or compounds containing any one or more of these elements or a mixture of any of the foregoing elements or compounds, said sintering aid containing from about 0.15 to about 5 percent by weight of aluminum, boron or beryllium or a mixture of any of these;
4. up to 25 percent by weight of a temporary binder;
5. a balance of silicon carbide powder having a surface area of from about 5 to about 100 square meters per gram;

b. shaping the dry mixture in such a way as to produce a shaped body having a density of at least about 45 percent of theoretical; and c. firing the shaped body in the absence of any substantial externally applied pressure under such conditions of time and temperature in an atmosphere inert to silicon carbide or in a vacuum at a temperature of between about 1900° C. and 2300° C. until a sintered body having a homogeneous fine grain microstructure with at least 50 percent of its silicon carbide grains on an area basis having a size not exceeding about 8 microns and an aspect ratio less than about 3, with graphite grains distributed substantially homogeneously throughout a matrix of silicon carbide, is formed.

25. A process according to claim 24 from about 0.67 to about 17 percent by weight of a solvent soluble, organic material which can be coked and has a carbon content of from about 25 to about 75 percent by weight of the organic material is employed in forming the homogeneous mixture which further includes from about 25 to about 100 percent of the combined weight of the silicon carbide powder, graphite powder, organic material which can be coked, sintering aid and temporary binder, of a solvent in which the organic material which can be coked is soluble; said mixing being done in such a way as to disperse the organic material which can be coked about the silicon carbide powder and graphite powder and to coat the silicon carbide powder and graphite powder therewith, and drying the mixture in such a way as to evaporate the solvent therefrom prior to shaping.

26. A process according to claim 24 wherein the silicon carbide of the raw batch is predominately alpha, non-cubic crystalline silicon carbide.

27. A process according to claim 24 wherein the silicon carbide of the sintered composite body is predominately alpha, non-cubic crystalline silicon carbide.

28. A process according to claim 24 wherein the body is fired for a time varying from about 10 to about 180 minutes; wherein the temperature is between about 1900° C. and 2300° C.; and said conditions of atmosphere are firing in a vacuum or up to about one atmosphere of pressure of a gas selected from the group consisting of nitrogen, argon, helium, neon and mixtures thereof.

29. A process according to claim 24 wherein the level of sintering aid provided in the body being sintered is maintained by enclosing the body being sintered within a sealed container which is impervious to the aluminum, boron or beryllium of the sintering aid at the sintering temperature and which has a volume approximating the size of the body being sintered.

30. A process according to claim 24 wherein the level of aluminum, boron or beryllium to be derived from the sintering aid and retained in the body being sintered is maintained by containing the body being sintered within a graphite container, which container has been saturated with the sintering aid or elemental aluminum, beryllium or boron by previous exposure to the sintering aid or aluminum, beryllium or boron at or about the temperature of sintering.

31. A process according to claim 24 comprising the steps of:
a. forming a homogeneous pre-mix by mixing together the components of
1. from about 91 to about 99.35 parts by weight silicon carbide having a surface area of from about 5 to about 100 square meters/gram;
2. from about 0.67 to about 17 parts by weight of organic material which can be coked at temperatures below about 1000° C. to provide amorphous carbon and having a carbon yield of from about 25 to about 75 percent by weight;
3. from about 0.15 to about 15 percent by weight of a sintering aid selected from the group consisting of aluminum, beryllium or boron or compounds containing any one or more of these elements or a mixture of any of the foregoing elements or compounds, said sintering aid containing from about 0.15 to about 5 parts by weight of aluminum, beryllium or boron or a mixture of any of these;
4. up to 25 percent by total weight of the silicon carbide powder, organic material which can be coked and sintering aid of a temporary binder; and
5. from about 25 to about 100 percent by total weight of the silicon carbide powder, organic material which can be coked, sintering aid and temporary binder of a solvent in which the organic material is soluble;
said mixing being done in such a way as to disperse the organic material about the silicon carbide powder and coat the silicon carbide powder therewith;
b. drying the pre-mix in such a way as to evaporate the solvent from the pre-mix;
c. breaking up the dried pre-mix so that it will pass an 40 mesh sieve;
d. adding graphite powder having an average particle size not in excess of 8 microns and a surface area of at least 5 square meters per gram to the pre-mix in an amount sufficient to bring the parts by weight of graphite in the resulting mixture in the range of from about 1 to about 48 parts and mixing the graphite powder and the pre-mix in such a way to disperse the graphite powder homogeneously throughout the resulting mixture; and
e. shaping the graphite-containing mixture in such a way as to produce a shaped body having a density of at least about 50 percent of theoretical density.

32. A process for producing sintered silicon carbide/graphite/carbon composite ceramic body according to claim 31 wherein the pre-mix comprises from about 0.3 to about 5 parts by weight of $B_xC$, wherein "x" is from 2 to 8, said $B_xC$ containing from about 0.3 to about 3.0 percent by weight boron.

33. A process according to claim 31 wherein the shaped body is fired for from about 20 to about 180 minutes at a temperature of from about 2100° C. to about 2300° C. and in up to about one atmosphere of pressure of a gas selected from the group consisting of argon, helium, neon, nitrogen and mixtures thereof.

34. A process according to claim 33 wherein the gas is approximately one atmosphere of the member selected from the group consisting of argon, helium and neon and the temperature is from about 2050° to about 2200° C.

35. A process according to claim 31 wherein the silicon carbide comprises predominately alpha, non-cubic crystalline silicon carbide.

36. A process according to claim 24 wherein the mixing together of the components comprises:
 a. dissolving an organic material which can be coked in a solvent; and
 b. mixing the solution so formed with the remaining components, and drying of the mixture prior to shaping.

37. A process according to claim 24 wherein the temporary binder is used in an amount of from about 4 to 14 percent.

38. A process according to claim 37 wherein the temporary binder is curable; and comprising a step of curing the temporary binder after shaping of the dried mixture but prior to firing of the shaped body.

39. A process according to claim 38 wherein the temporary binder is polyvinyl alcohol and the curing is accomplished by heating the shaped body at a temperature of about 90° C. to about 150° C. for about 1 to about 2 hours.

* * * * *